R. STRAUBEL & C. J. VETTER.
EYEGLASSES.
APPLICATION FILED OCT. 14, 1910.
988,954.
Patented Apr. 4, 1911.
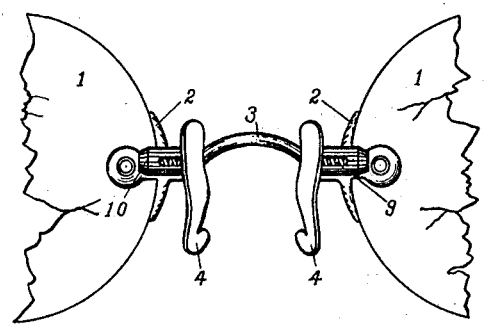
Fig. I.
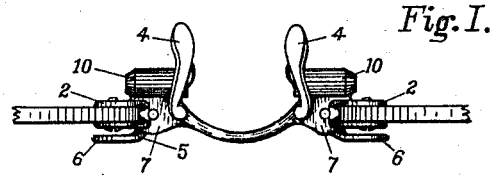
Fig. II.
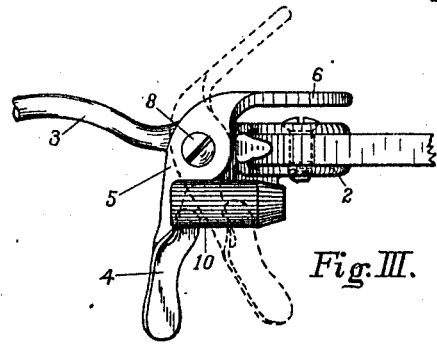
Fig. III.
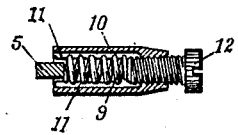
Fig. IV.
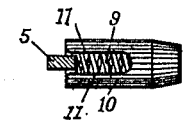
Fig. V.
WITNESSES:
Frank R. Mac Niven
Reginald R. Miller.
INVENTORS
RICHARD STRAUBEL & CHARLES J. VETTER
BY
Harry H. Styles
ATTORNEY

UNITED STATES PATENT OFFICE.

RICHARD STRAUBEL AND CHARLES JULES VETTER, OF BROOKLYN, NEW YORK, ASSIGNORS TO AMERICAN OPTICAL COMPANY, OF SOUTHBRIDGE, MASSACHUSETTS, A CORPORATION OF MASSACHUSETTS.

EYEGLASSES.

988,954.     Specification of Letters Patent.     Patented Apr. 4, 1911.

Application filed October 14, 1910. Serial No. 587,041.

*To all whom it may concern:*

Be it known that we, RICHARD STRAUBEL and CHARLES J. VETTER, citizens of the United States, residing at Brooklyn, in the county of Kings and State of New York, have invented certain new and useful Improvements in Eyeglasses, of which the following is a specification.

Our invention relates to certain improvements in eyeglasses, and more particularly to that form of eyeglass in which there are employed spring actuated nose clamps or guards pivoted adjacent the opposite ends of the bridge, and comprises an actuating spring located in a barrel or tube on the lens connection, a slot or guide in the barrel adapted to guide the nose clamp lever and act as a steady rest therefor, and means for adjusting the spring and holding it in contact with the nose clamp lever.

The object of the invention is to provide means for actuating the nose clamps which are not conspicuous when the eyeglasses are in use, and the tension of which on the nose may be readily adjusted and regulated.

Another object of the invention is to provide means for steadying the motion of the nose clamp levers and preventing undue wear and strains on the pivots thereof.

We attain these objects by the construction illustrated in the accompanying drawings in which:

Figure I— represents the rear elevation of a pair of eyeglasses embodying our invention. Fig. II— is a bottom view inverted of Fig. I. Fig. III— is an enlarged detail of a portion of the top. Fig. IV— is a longitudinal section through the barrel showing a modification whereby the tension on the spring may be regulated. Fig. V— is an enlarged view of the rear side of the barrel showing the guide slots, the spring, and the nose clamp lever in section.

Similar figures refer to similar parts throughout the several views.

Referring to the drawings: a pair of lenses 1 are connected by means of the usual clips 2 and the bridge 3.

As the structure about to be described is in duplicate a single unit only will be specified for clearness of reference.

The nose clamp 4 is attached to an actuating lever 5 one end 6 of which is fashioned into a handle or finger piece for operating the lever. The lever is pivoted adjacent the bridge end 7 which is widened out in the well known manner to form a bearing surface, and is held in place by a pivot post 8. The lever is actuated by a spiral spring 9 located in a longitudinally extending tube or barrel 10 on the lens clip 2 on the rear side of the lens, the side of which, toward the nose is split or slotted to form guides or steady bearings 11 for the lever 5 which operates in the slot of the barrel in an arc about its pivot and contacts with the end of the spring toward the nose, the amount of travel, however, of the lever being limited so that the lever will prevent the spring from leaving the barrel 10. If desired the pressure of the nose clamps against the nose may be regulated and adjusted within prescribed limits by means of a set screw 12 threaded into the end of the barrel away from the nose as indicated in Fig. IV.

The parts may be assembled as follows: The lenses are attached to the clips 2 and bridge 3 in the usual manner. The spring is next inserted in the tube of the barrel and the lever placed on the bridge, with the pivot hole in alinement with the pivot hole in the bridge end, and the rear arm of the lever extending into the slot in the barrel and contacting with the end of the spring. The pivot screw or post is next put in place and if desired the set screw 12 inserted in the end of the barrel away from the nose, and screwed up until it engages the spring.

To place the eyeglasses on the nose, the finger piece ends 6 of the levers are drawn toward each other compressing the springs and opening out the guards or nose clamps 4 to their full width. The eyeglasses are then inserted in place on the nose and the finger pieces 6 released, whereupon the springs will expand and press the nose clamp levers toward each other and force the nose clamps into supporting engagement with the flesh at the side of the nose.

To remove the eyeglasses the operation is the reverse of that described for placing them in place. The finger pieces are drawn toward each other, compressing the springs and releasing the nose clamps, and the eyeglasses pulled away from the face and out of engagement with the nose.

It will be seen that by the use of our invention, the springs are located so as to be invisible from the front, the springs may be easily and cheaply replaced, the long overhang of the levers is supported and excessive wear and bending minimized, the usual high pivot post is avoided and a thin, durable and neat mounting obtained.

Having now described our invention, what we claim as new and desire to secure by Letters Patent is:

1. In eyeglasses the combination of lens holding means, a nose clamp lever pivoted on the lens holding means, a barrel on the lens holding means unalined with the pivot of the nose clamp lever and having a guide slot, and a spring in the barrel adapted to actuate the nose clamp in the guide slot.

2. In eyeglasses the combination of a lens, means for holding the lens, a nose clamp lever pivoted on the lens holding means and having an integral finger piece or handle, a barrel on the lens holding means having a slot adapted to receive the nose clamp lever, and a spring in the barrel adapted to actuate the nose clamp lever in said slot.

3. In eyeglasses the combination of lens holding means, a nose clamp lever pivoted on the lens holding means and a barrel on the lens holding means having a guide slot adapted to guide the nose clamp lever.

4. In eyeglasses the combination of a lens clip, a bridge member attached to the lens clip, a nose clamp lever pivoted on the bridge member, a barrel on the lens clip having a slot adapted to guide the nose clamp lever, and a spring in the barrel adapted to actuate the nose clamp lever.

5. As an article of manufacture a mounting for an eyeglass comprising lens holding means connected by a bridge, barrels or tubes on the lens holding means adapted to hold springs, and slots in the barrels adapted to receive, and guide the nose clamp levers substantially as shown and described.

6. In eyeglasses having pivoted nose clamps the combination of a lens clip, a barrel on the lens clip unalined with the pivot of the nose clamp, a spring in the barrel and means for adjusting the tension on the spring.

7. In eyeglasses having pivoted nose clamps the combination of lens holding means, a barrel thereon unalined with the pivot of the nose clamp, a spring in the barrel, and means for adjusting the tension on the spring.

8. In eyeglasses having pivoted nose clamps the combination of lens holding means, a barrel thereon unalined with the pivot of the nose clamp, a spring in the barrel, and a screw adapted to enter the barrel and regulate the tension on the spring.

9. In eyeglasses the combination of a lens clip, a bridge member attached to the lens clip, a nose clamp lever pivoted on the bridge member, a barrel on the lens clip unalined with the pivot of the nose clamp, a spring in the barrel, and means for adjusting the tension on the spring.

10. In eyeglasses the combination of lens holding means having a barrel with a slot, a lever pivoted on the lens holding means and operating in the slot in the barrel, a spring in the barrel adapted to actuate the lever, and means for increasing or decreasing the tension of the spring.

In testimony whereof we affix our signatures in presence of two witnesses.

RICHARD STRAUBEL.
CHARLES JULES VETTER.

Witnesses:
ABRAHAM DAVIDSON,
HERMAN MANDELL.

---

Copies of this patent may be obtained for five cents each, by addressing the "Commissioner of Patents, Washington, D. C."